United States Patent [19]

Jorgensen, Jr.

[11] 4,444,091
[45] Apr. 24, 1984

[54] SAFETY LOCK-OFF THROTTLE DEVICE

[75] Inventor: Harry S. Jorgensen, Jr., Bedford, Ohio

[73] Assignee: The Stanley Works, New Britian, Conn.

[21] Appl. No.: 296,472

[22] Filed: Aug. 26, 1981

[51] Int. Cl.³ ............... F15B 13/04; F16K 35/00; B23B 45/04
[52] U.S. Cl. ............... 91/427; 251/95; 251/111; 173/169
[58] Field of Search ............ 91/59, 418, 424, 427; 251/95, 96, 111; 173/169

[56] References Cited

U.S. PATENT DOCUMENTS

| | | | |
|---|---|---|---|
| 2,946,315 | 7/1960 | Doeden | 173/169 |
| 3,357,677 | 12/1967 | Tasker | 251/111 |
| 3,861,476 | 1/1975 | Borsum | 251/111 |

*Primary Examiner*—Robert E. Garrett
*Assistant Examiner*—Richard L. Klein
*Attorney, Agent, or Firm*—Hayes & Reinsmith

[57] ABSTRACT

A safety device for a fluid operated tool features a throttle lever which is always freely movable but is normally rendered inoperable to effect tool actuation except in response to a consciously deliberate two step action wherein a first valve control must be actuated before an on-off valve controlling fluid flow may be operated by a second valve control in response to throttle lever operation to drive the on-off valve from a normally closed position to an open position establishing an open fluid flow condition for tool start-up.

18 Claims, 8 Drawing Figures

SAFETY LOCK-OFF THROTTLE DEVICE

BACKGROUND OF THE INVENTION

To prevent accidental start-up of fluid operated tools such as grinders, nutsetters, buffers and similar tools having fluid motors, efforts have been directed to prevent accidental throttle lever actuation which in turn serves to operate a valve controlling fluid flow to effect motor start-up. This is particularly important in tools having a generally tubular body connected to a source of pneumatic pressure, e.g., through an attached pressurized air hose wherein the hose itself may whip and roll an unattended tool and accidentally effect tool start-up.

Conventional approaches to date have sought to prevent accidental tool start-up by locking the throttle lever. Various types of safety throttle release devices have been proposed which first must be operated to release the initially locked throttle lever to permit tool operation.

Such known devices normally are subject to abuse and, in the event of undue force being applied when the throttle lever is locked against movement, parts damage may occur. Moreover, the known devices conventionally have an externally located throttle valve lock which is subject to being tampered with or being removed in its entirety, thereby defeating the safety purpose of such devices.

It is accordingly an object of this invention to provide a safety device of the type described which is tamper resistant and contained within an overall tool envelope of minimized size to permit maximum flexibility in the tool application and which features a freely movable throttle valve control requiring a purposeful two-step operating action to effect tool start-up while minimizing any possibility of inadvertent or accidental working of the tool which may cause accidental damage or injury upon unintended full throttle actuation of the tool.

BRIEF SUMMARY OF THE INVENTION

The safety device of this invention is particularly suited for use in a power tool having a fluid operated motor and a fluid supply passageway with an on-off valve controlling the fluid flow conditions in the passageway. The safety device itself features first and second independently operable valve controls which are respectively freely movable between starting and actuated positions. When the first valve control is deliberately moved into actuated position, the second valve control, which may be operated, e.g., by a throttle lever, is then and only then drivingly engaged in its starting position to the on-off valve for moving it between closed and open positions responsive to movement of the second valve control between its starting and actuated positions. The second valve control is rendered ineffective to actuate the on-off valve when the first valve control is in its normal starting position, thereby preventing accidental movement of the on-off valve from its normally closed position, while the second valve control is always permitted to be freely moved between its starting and actuated positions. This invention further features a selectively operable, tamper resistant locking mechanism between the second valve control and the on-off valve which locking mechanism is disposed in its entirety internally of the tool housing.

Other details, objects and advantages of this invention will become apparent as the following description of a presently preferred embodiment of practicing the same proceeds.

DESCRIPTION OF A PREFERRED EMBODIMENT

Figure 1:
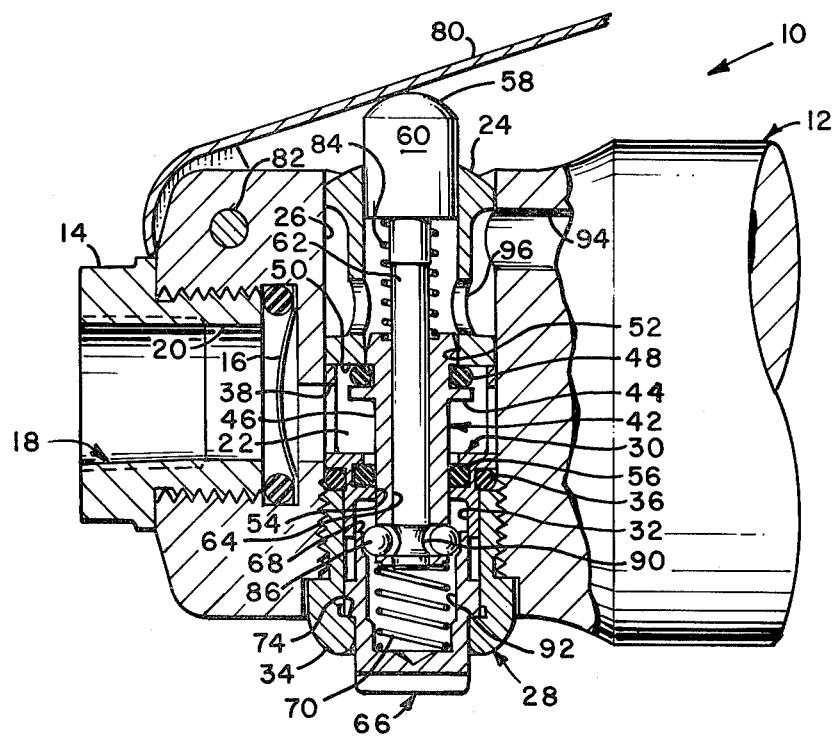
FIG. 1 is a side view, partly broken away and partly in section, illustrating certain components of a preferred embodiment of a safety device incorporating this invention and showing an on-off valve in a normally closed position with two associated valve controls in starting positions.

Referring now to the drawings in detail, a power tool 10 such as a nutsetter and the like having a fluid operated motor, not shown, will be understood to have a generally tubular motor housing 12 and a handle, not shown, to which an air inlet bushing 14 is adapted to be attached. It is to be understood that a fluid motor, preferably a conventional rotary vane type air motor, is mounted in the motor housing 12 for driving a spindle, not shown, operatively connected to a work engaging element of the power tool.

Figure 5:
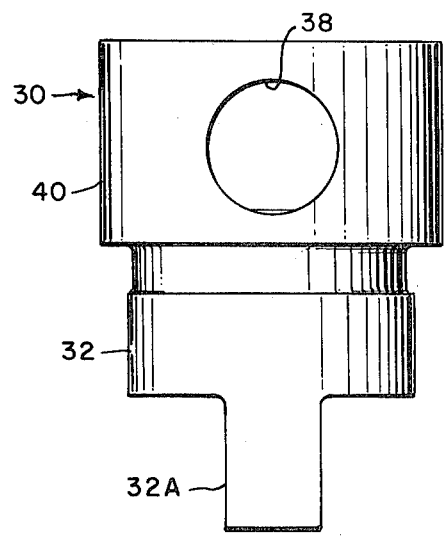
FIG. 5 is an enlarged side view of an air regulator component.
Figure 6:
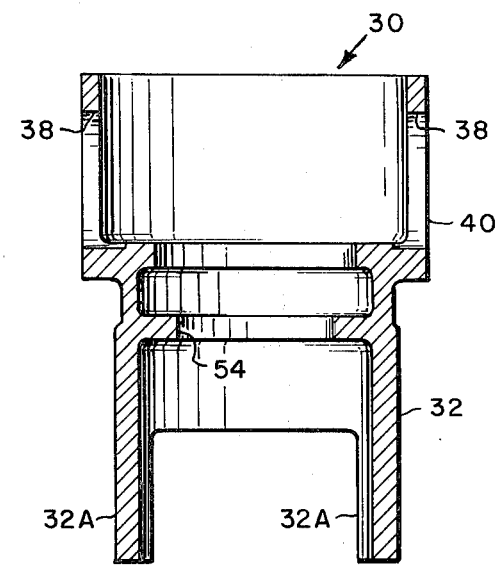
FIG. 6 is a cross-sectional view of the regulator of FIG. 5.
Figure 7:
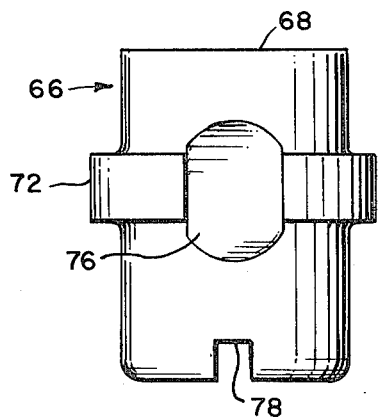
FIG. 7 is a side view of a lock button component incorporated in the safety device of this invention.

Compressed air for driving the motor is supplied through a coupling at the rear of the handle and flows through the air inlet bushing 14 and through a suitable inlet screen 16 in a passageway generally designated 18, comprising a series of passages described more specifically below, leading to the motor. An air inlet passage 20 in bushing 14 communicates with a chamber 22 jointly defined by a bushing 24, fixed in one end of a bore 26 diametrically extending across housing 12, and by an air regulator assembly 28 closing the other end of bore 26. The air regulator assembly 28 includes an inner cup-like member 30 (FIGS. 5 and 6) having a shank 32 of reduced diameter received in a hollow plug 34 screwed into bore 26. The inner cup-like regulator member 30 is retained against unintended axial movements by bushing 24 and an O-ring 36 encircling its shank 32 and seated on an inner end of plug 34.

Inlet port 38 formed in wall 40 of the cup-like member 30 of the air regulator assembly 28 serves to connect the air inlet passage 20 and chamber 22. As described more specifically below, the volume of air admitted into chamber 22 is governed by rotatably adjusting the position of the inner cup-like member 30 of air regulator assembly 28 to vary the effective size of inlet port 38 which serves to connect the air inlet passage 20 and chamber 22. Assuming a load of an established value, an operator therefore may vary the motor power and spindle speed to suit the tool application.

A generally tubular on-off valve 42 is received in chamber 22 and is shown having a radial flange 44 intermediate the ends of its valve body 46 with an annular seal 48 mounted on one side of flange 44 for engagement with an inner end 50 of the bushing 24 which serves as a valve seat for the seal 48 which serves as a valve member. In a normally closed position depicted in FIG. 1, seal 48 engages the valve seat 50, and one end of the valve body 46 extends through a central opening 52 in the inner end of bushing 24. An opposite end of valve body 46 extends coaxially through a central opening 54 of inner cup-like member 30 of air regulator assembly 28 and is supported therein for axial reciprocating movement by a suitable O-ring 56 encircling valve body 46 and supporting it for shifting movements in opposite axial directions toward and away from its illustrated normally closed position in FIG. 1. Seals 36 and 56 accordingly provide a fluid tight construction preventing air leakage to atmosphere through the regulator end of bore 26.

For controlling operation of on-off valve 42, valve control means is provided which includes a valve pin 58 received in chamber 22 and having an exposed stem 60 projecting through bushing 24 and a shank 62 of reduced size coaxially projecting from stem 60 through bushing 24 and a longitudinally extending axial opening 64 in body 46 of on-off valve 42 in coaxial alignment with these components.

The valve control means further includes a hollow, generally cyindrical lock button 66 closed at an outer end which is exposed for manual manipulation at the end of valve bore 26 diametrically opposed from valve pin stem 60. An open terminal end 68 is formed on lock button 66 and disposed within the confines of air regulator assembly 28 in coaxial surrounding relation to valve body 46 and valve pin 58. A coil compression spring 70 is received within the hollow confines of lock button 66 with opposite ends of spring 70 seated against the closed end of lock button 66 and an adjacent terminal end of valve body 46 for biasing lock button 66 toward its starting position shown in FIG. 1 and on-off valve 46 toward its normally closed position.

Lock button 66 has an intermediate external flange 72 which in starting position (FIG. 1) seats on an internal shoulder 74 of plug 34. The outside diameter of the open terminal end 68 of lock button 66 is of reduced size relative to its flange 72 and to the inside diameter of air regulator shank 32 such that the open terminal end 68 of lock button 66 may be received within the confines of the inner cup-like member 30 for axial shifting movement toward and away from the inside shoulder 74 of plug 34 axially within bore 26. Spring 70 will be seen to not only bias valve body 46 toward its normally closed position, wherein it is normally held in position with the assistance of air pressure, but also to urge lock button 66 toward its illustrated position in FIG. 1 which will be understood to be a lock button starting position.

As best seen in FIGS. 5-8, lock button 66 has a pair of diametrically opposed recesses or cut outs 76 in its side wall and flange 72 for receiving axially extending legs 32A of shank 32 of air regulator member 30 to provide a rotary drive connection between lock button 66 and air regulator member 30. I.e., upon rotating lock button 66, its flange 72 will engage and drive the shank legs 32A of the air regulator member 30 in a desired angular direction thereby to adjust the size of the effective inlet port 38 to the chamber 22, the adjustment being facilitated by a screw driver slot 78 which is easily accessible to an operator at the exposed closed end of lock button 66.

Figure 2:
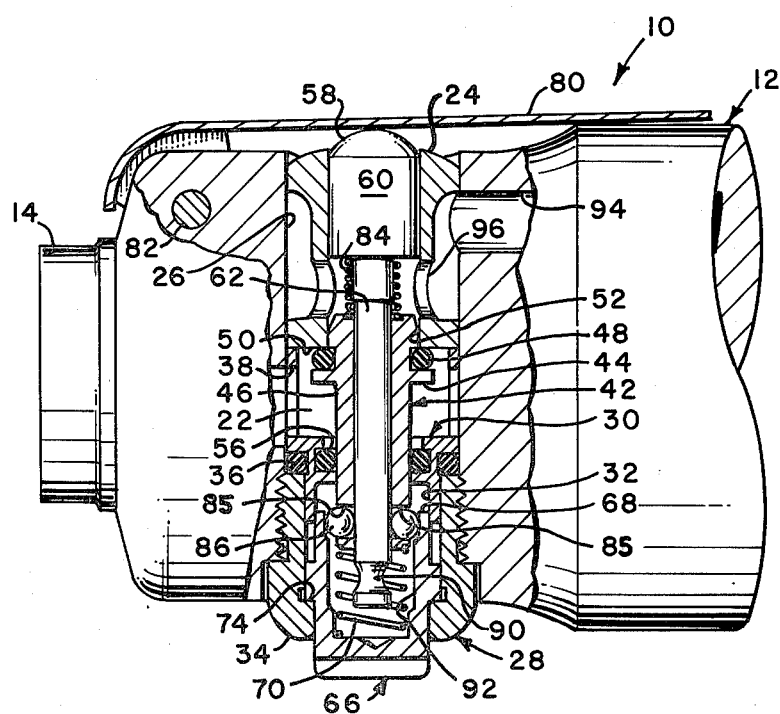
FIG. 2 is a view similar to FIG. 1 showing the on-off valve in normally closed position and one valve control in actuated position.

To actuate the motor, a hand lever 80 is pivotally supported on the housing 12 by pin 82 and engages the projecting end of valve pin stem 60 which may be depressed to drive the valve pin 58 axially from its starting position (FIG. 1) to its actuated position (FIG. 2). A second coil compression spring 84 is illustrated as having its opposite ends seated on an underlying shoulder of stem 60 and the adjacent terminal end of valve body 46 and coiled about shank 62 of the valve pin 58 to serve as a valve pin return spring which biases the valve pin toward its illustrated starting position of FIG. 1.

To minimize any accidental actuation of the fluid motor by inadvertent depression of valve pin 58, for whatever reason, selectively operable releasable locking means is provided for insuring that any motor actuation is effectively limited to an intentional sequential operation of the control valve means by an operator to positively effect motor operation under controlled conditions. More specifically, the releasable locking means of this invention is provided to selectively engage and lock the valve pin 58 and body 46 of on-off valve 42 only after lock button 66 first has been deliberately depressed from starting position (FIGS. 1 and 2) by manual actuation into actuated position (FIG. 3) before the operator depresses hand lever 80 controlling valve pin 58.

Figure 8:
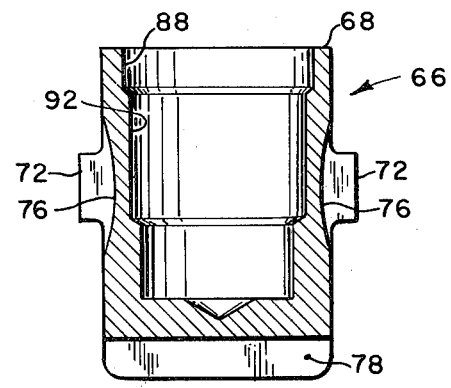
FIG. 8 is a cross-sectional view of the lock button of FIG. 7.

In the specifically illustrated embodiment, body 46 of on-off valve 42 has a pair of sidewall openings 85 (FIG. 2) each of which receives a detent ball 86. Each ball 86, in the starting positions of valve pin 58 and lock button 66 as seen in FIG. 1, is trapped in registration with an enlarged inside diameter wall 88 (as best seen in FIG. 8) at the terminal open end 68 of lock button 66 surrounding valve body 46, and an inner recess defined by a groove 90 circumferentially extending about the terminal end of valve pin shank 62.

In the position shown in FIG. 1, the detent balls 86 are in disengaged relation to valve pin 58 and accordingly any depression of hand lever 80 to drive valve pin 58 from its starting position (FIG. 1) to its actuated position (FIG. 2) will simply result in an axial movement of valve pin shank 62 past detent balls 86 with the on-off valve 42 and lock button 66 remaining fixed in position.

This construction accordingly serves as a safety feature in the event of accidental valve pin actuation, for no concomitant movement of body 46 of on-off valve 42 is effected. Thereafter, upon release of hand lever 80, valve pin 42 is restored to its starting position (FIG. 1) by the biasing action of valve pin return spring 84.

Figure 3:
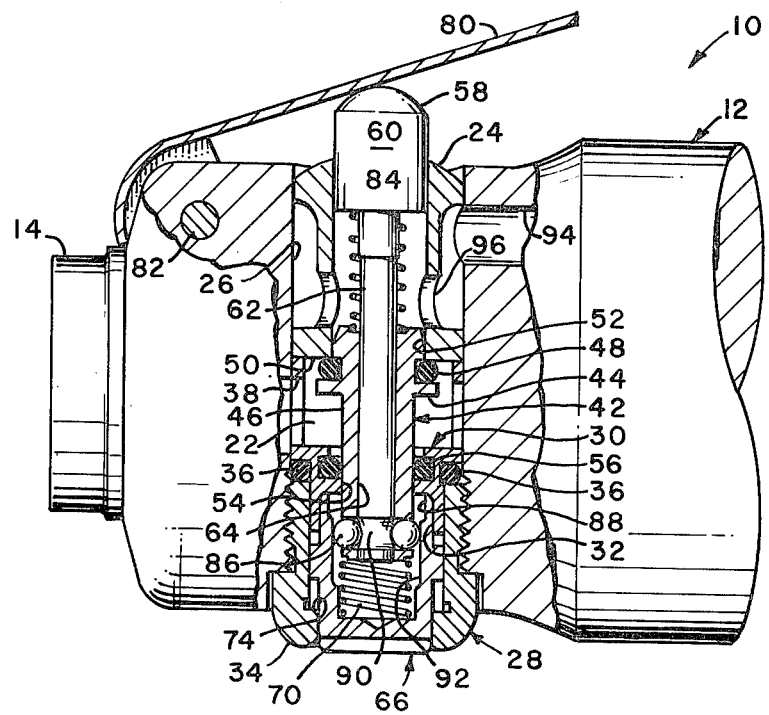
FIG. 3 is a view similar to FIG. 1 showing the on-off valve in normally closed position and the other valve control in actuated position.
Figure 4:
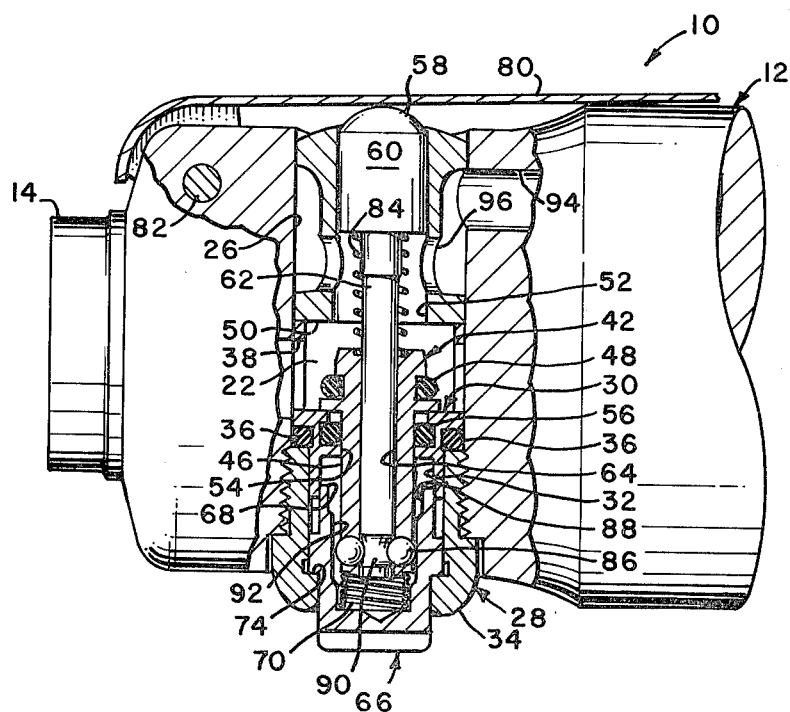
FIG. 4 is a view similar to FIG. 1 showing both valve controls in actuated positions with the on-off valve in open position.

With the air supply "on" and upon depressing lock button 66 from its starting position (FIGS. 1 and 2) into its actuated position (FIG. 3), detent balls 86 move into locked engagement within valve body 46 in abutment with valve pin shank 62 surrounding its groove 90 (FIG. 3). Such action is achieved by virtue of a camming action of a reduced intermediate diameter inside wall portion 92 (FIG. 8) of lock button 66 which drives detent balls 86 radially inwardly into locking engagement within mating groove 90 of valve pin shank 62. Thereafter, and only upon subsequent actuation of hand lever 80, an open fluid flow condition is established in the passageway 18 upon movement of valve pin 58 into an operative actuated position (FIG. 4).

Upon actuating hand lever 80, the valve pin 58 accordingly is driven axially within the bore 26 away from its normally closed position to effect a following movement of body 46 of on-off valve 42 from its illustrated closed position (FIG. 3) into an open fluid flow position (FIG. 4) permitting air to flow into motor passage 94 via fluid outlet 96 in bushing 24 at the downstream end of chamber 22. Lock button 66 may be released during such action to return to starting position (FIG. 4), and upon releasing hand lever 80, valve pin return spring 84 automatically drives valve pin 58 from its actuated position (FIG. 4) into starting position (FIG. 1) and the valve return spring 70 serves to restore on-off valve 42 into its normally closed position (FIG. 1) in unison with the return movement of valve pin 58. The valve return spring 70 additionally serves to maintain lock button 66 in its starting position (FIG. 1) in a ready condition for repeat operation with the tool 10 limited to a single cycling operation as described above by virtue of the disclosed construction.

By virtue of the diametrically opposed disposition of the valve controls, accidental dropping or rolling of the tubular tool normally will not result in any undesired tool start-up but will require two separate, independent and purposeful movements for intentional tool operation. The coaxial arrangement of the disclosed safety device components is particularly suited for quick and easy assembly in a compact envelope for extended use under rugged operating conditions with minimized service requirements. Moreover, the free valve pin feature of this invention provides for depression of valve pin 58 without parts damage or tool actuation in the event the tool 10 were left on a workroom floor unattended and were rolled by the action of any attached pressurized hose, e.g., or if the lever 80 itself were otherwise actuated for whatever reason.

While a presently preferred embodiment of this invention has been shown and described, and a preferred embodiment of practicing the same has been illustrated, it is to be understood that the invention is not limited thereto, but may be otherwise variously embodied within the scope of the following claims.

I claim:

1. In a power tool including a fluid operated motor, a housing having a fluid supply passageway for supplying fluid to the motor and an on-off valve mounted in the housing for movement between a normally closed position and an open position for establishing closed and open fluid flow conditions in the passageway, a safety device for controlling the on-off valve comprising first and second independently operable valve controls respectively movable between starting and actuated positions, means in the housing supporting the second valve control for movement in non-interfering relation to the first valve control, the second valve control being freely movable from its starting position toward its actuated position regardless of the position of the first valve control, a selectively operable interlock for drivingly connecting the second valve control in its starting position to the on-off valve solely when the first valve control is in its actuated position for moving the on-off valve between its closed and open positions responsive to movement of the second valve control between its starting and actuated positions, the first valve control in its starting position rendering the second valve control ineffective for moving the on-off valve from its normally closed position.

2. The device of claim 1 wherein the housing is of a generally tubular configuration, wherein the on-off valve and the valve controls are mounted in the housing in coaxially aligned relation, the first and second valve controls having exposed manually actuatable stems disposed in diametrically opposed relation to one another on opposite sides of the housing.

3. The device of claim 1 further including spring means urging the on-off valve toward its normally closed position and the valve controls toward their respective starting positions.

4. The device of claim 1 wherein said means in the housing support the second valve control for movement in non-interfering relation to both the first valve control and the on-off valve, the second valve control being freely movable between its starting and actuated positions regardless of the positions of the first valve control and the on-off valve.

5. The device of claim 1 wherein the passageway includes a fluid inlet, a fluid outlet and a motor supply passage, the fluid inlet being adapted to be connected to a pneumatic pressure source, the fluid outlet being connected to the motor supply passage, the housing having a valve bore therein interconnecting the fluid inlet and outlet, a valve seat in the bore intermediate the inlet and outlet, and a valve member mounted on the on-off valve and shiftable in the bore in first and second opposite axial directions respectively toward said normally closed position, wherein the valve member is seated on the valve seat to establish a closed fluid flow condition in the passageway, and toward said open position to establish the open fluid flow condition in the passageway.

6. The device of claim 5 further including a fluid-flow regulator comprising a hollow plug mounted in the valve bore in coaxial surrounding relation to the first valve control, the fluid-flow regulator having an aperture in a side wall thereof defining said fluid inlet, and selectively engageable drive means between the first valve control and the fluid-flow regulator for selectively rotating the fluid-flow regulator for adjusting the size of the fluid inlet.

7. In a power tool including a fluid operated motor, a housing having a fluid supply passageway for supplying fluid to the motor and an on-off valve mounted in the housing for movement between a normally closed position and an open position for establishing closed and open fluid flow conditions in the passageway, a safety device for controlling the on-off valve comprising first and second independently operable valve controls respectively movable between starting and actuated positions, the second valve control being freely movable from its starting position toward its actuated position regardless of the position of the first valve control, the second valve control in its starting position being drivingly connected to the on-off valve solely when the first valve control is in its actuated position for moving the on-off valve between its closed and open positions responsive to movement of the second valve control between its starting and actuated positions, the first valve control in its starting position rendering the second valve control ineffective for moving the on-off valve from its normally closed position, and releasable locking means operable in response to movement of the first valve control into its actuated position for selectively interlocking the second valve control to the on-off valve.

8. In a power tool including a fluid operated motor, a housing having a fluid supply passageway for supplying fluid to the motor and an on-off valve mounted in the housing for movement between a normally closed position and an open position for establishing closed and open fluid flow conditions in the passageway, a safety device for controlling the on-off valve comprising first and second independently operable valve controls respectively movable between starting and actuated positions, the second valve control being freely movable from its starting position toward its actuated position regardless of the position of the first valve control, the second valve control in its starting position being drivingly connected to the on-off valve solely when the first valve control is in its actuated position for moving the on-off valve between its closed and open positions responsive to movement of the second valve control between its starting and actuated positions, the first valve control in its starting position rendering the second valve control ineffective for moving the on-off valve from its normally closed position, and releasable locking means movable between engaged and disengaged positions, the locking means in engaged position securing the on-off valve and the second valve control for simultaneous movement with one another upon moving the first valve control into its actuated position with the second valve control in starting position and the on-off valve in normally closed position.

9. The device of claim 7 or 8 wherein the releasable locking means is mounted within the confines of the housing.

10. The device of claim 7 or 8 wherein the releasable locking means is mounted on the on-off valve between the first and second valve controls.

11. The device of claim 7 wherein the locking means automatically moves from engaged to disengaged positions when the second valve control returns to starting position in unison with the return of the on-off valve to its normally closed position with the first valve control in starting position.

12. The device of claim 8 wherein the first and second valve controls cooperate with the on-off valve for limiting movement of the on-off valve to single cycling between its starting and actuated positions, and wherein the locking means automatically moves into disengaged position upon return of the on-off valve to normally closed position with the first valve control in starting position.

13. In power tool including a fluid operated motor, a housing having a fluid supply passageway for supplying fluid to the motor and an on-off valve having a tubular body mounted in the housing for movement between a normally closed position and an open position for establishing closed and open fluid flow conditions in the passageway, a safety device for controlling the on-off valve comprising first and second independently operable valve controls respectively movable between starting and actuated positions, the first valve control comprising a lock button supported in the housing in coaxial telescopically surrounding relation to the tubular valve body, the second valve control comprising a valve pin supported in the housing and extending into a longitudinally extending central opening of the tubular valve body in coaxial relation to the valve body and to the lock button, the valve pin being freely movable from its starting position toward its actuated position regardless of the position of the lock button, the valve pin in its starting position being drivingly connected to the on-off valve solely when the lock button is in its actuated position for moving the on-off valve between its closed and open positions responsive to movement of the valve pin between its starting and actuated positions, the lock button in its starting position rendering the valve pin ineffective for moving the on-off valve from its normally closed position, and releasable locking means mounted on the valve body between the valve pin and lock button for selectively interlocking the valve body in its normally closed position to the valve pin in its actuated position whereby the valve body is conditioned for movement between its closed and open positions responsive respectively to operating movements of the valve pin between its starting and actuated positions.

14. The device of claim 13 wherein the releasable locking means is rendered inoperative when the lock button is in its starting position.

15. The device of claim 13 wherein the releasable locking means selectively engages the valve pin and the valve body after the lock button is moved into actuated position whereby the lock button causes the releasable locking means to interlock the valve pin and the valve body for reciprocating axial movement in unison with one another for moving the valve body from its normally closed position to open position responsive to movement of the valve pin from its starting position to its actuated position.

16. The device of claim 13 wherein first spring means is mounted between the valve body and lock button and biases the lock button toward its starting position and the valve body toward its normally closed position, and wherein second spring means is mounted between the valve body and valve pin and biases the valve pin toward its starting position.

17. The device of claim 13 wherein the lock button is of a hollow construction having an open end received in the housing, a closed end disposed outside the housing and a cylindrical inside wall in coaxial surrounding relation to the valve pin and valve body, wherein the cylindrical inside wall of the lock button includes a relatively enlarged diameter portion at its open end and an adjacent intermediate portion of relatively reduced diameter, and wherein the releasable locking means includes a recess formed on the valve pin, a detent opening formed in the valve body registrable with the valve pin recess and the enlarged inside wall portion at the open end of the lock button when the valve pin and lock button are each in starting position with the valve body in its normally closed position, and a locking detent received in the detent opening of the valve body.

18. The device of claim 17 wherein the locking detent comprises a ball, wherein the detent ball is disengaged relative to the valve pin with the lock button in starting position, such that the valve body remains in normally closed position responsive to valve pin movement, and wherein the reduced diameter intermediate inside wall portion of the lock button urges the detent ball into interlocking engagement with the valve pin and valve body within the valve pin recess upon moving the lock button from its starting position to its actuated position, whereby valve pin movement from starting position to its actuated position effects a corresponding following movement of the valve body from its normally closed to open positions.

* * * * *